April 8, 1952     R. G. McGOWAN     2,592,307
WHEEL TRUCK OR DOLLY
Filed Aug. 9, 1950     2 SHEETS—SHEET 1
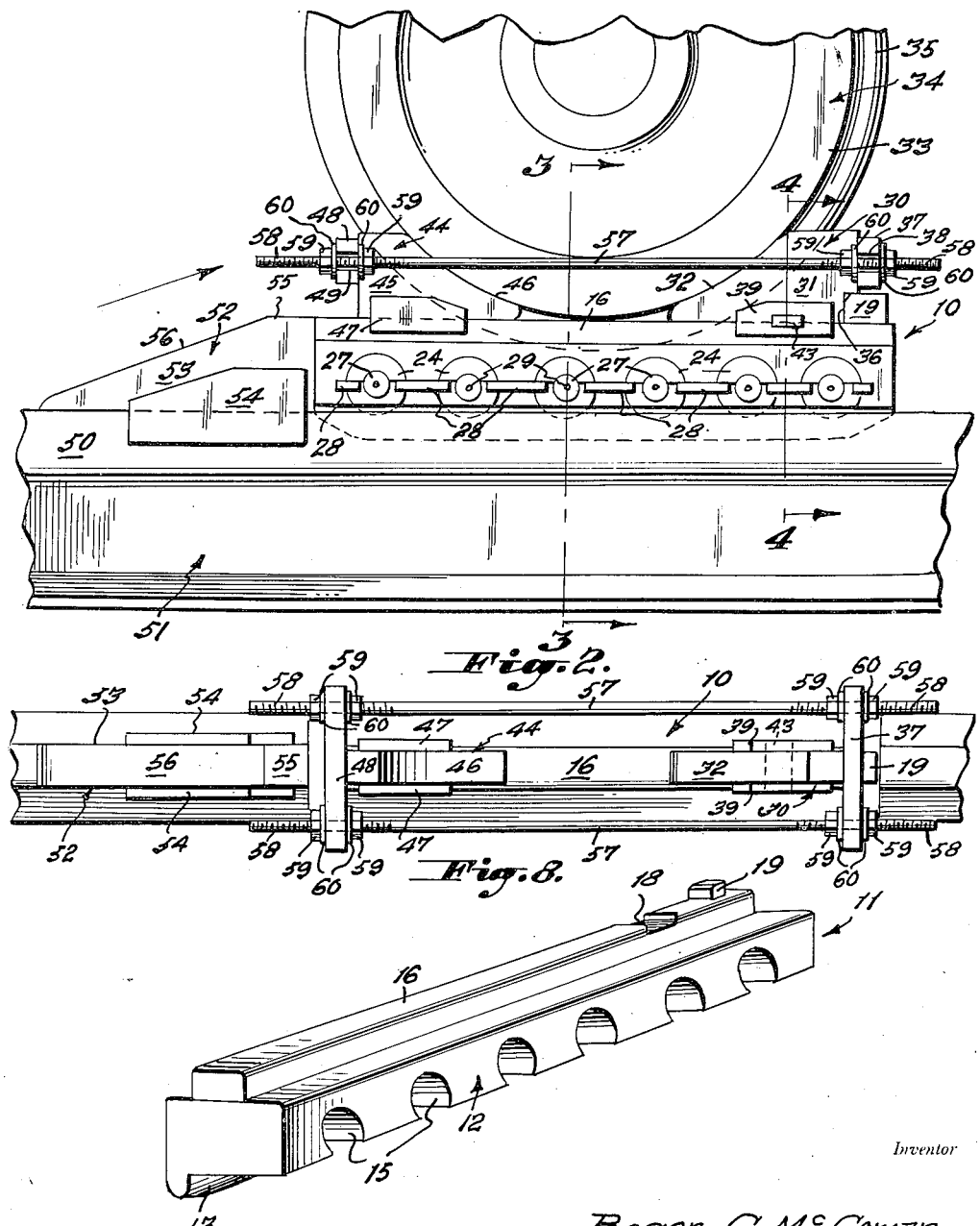
Inventor
Roger G. McGowan
By John N. Randolph
Attorney April 8, 1952     R. G. McGOWAN     2,592,307
WHEEL TRUCK OR DOLLY
Filed Aug. 9, 1950     2 SHEETS—SHEET 2
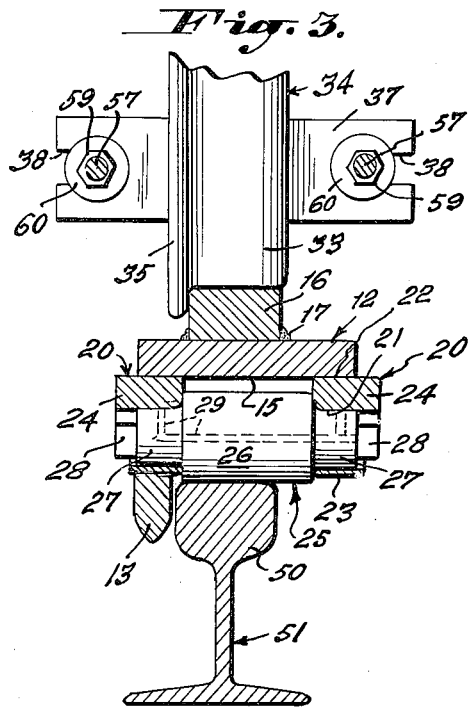
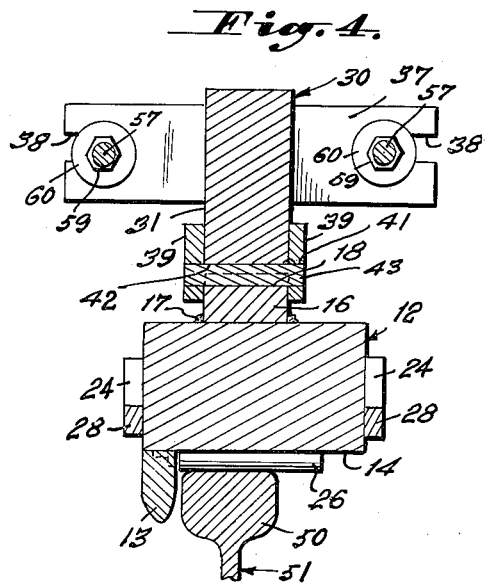
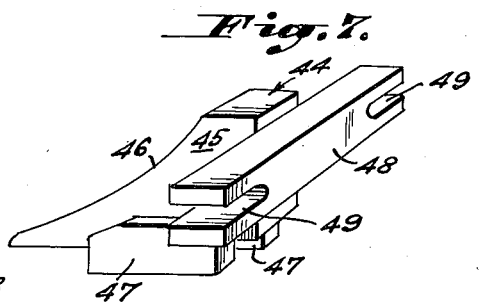
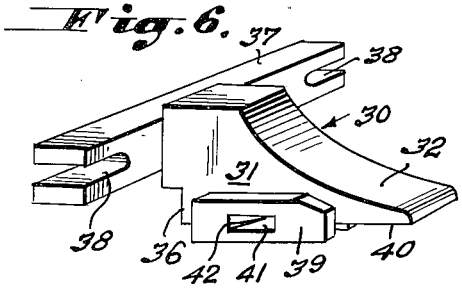
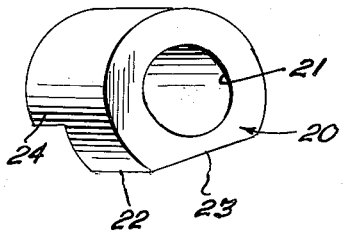
Inventor
Roger G. McGowan
By John N. Randolph
Attorney

UNITED STATES PATENT OFFICE 2,592,307

WHEEL TRUCK OR DOLLY

Roger G. McGowan, Youngstown, Ohio

Application August 9, 1950, Serial No. 178,521

9 Claims. (Cl. 105—216)

This invention relates to a novel truck or dolly for supporting a defective wheel above and out of engagement with a railroad rail and which truck or dolly is adapted to ride the rail so that the locomotive or railroad car having the defective wheel, which is supported on the truck or dolly, may be conveniently moved over a pair of rails to a repair shop or other location where repair or replacement of the wheel can be best accomplished.

More particularly, it is an aim of the present invention to provide a truck or dolly especially adapted for supporting a locomotive wheel above and out of engagement with a rail and which dolly is so constructed that it will be retained in position on the rail for rolling movement with respect thereto by the defective wheel supported on the dolly to enable a car or locomotive, having such wheel, to be propelled substantially unhampered thereby on a pair of rails.

Still a further object of the invention is to provide a rail engaging truck or dolly onto which a defective locomotive or railroad car wheel may be readily moved or from which the car wheel may be readily removed.

Still a further object of the invention is to provide a rail engaging truck or dolly having novel means for removably securing a car or locomotive wheel on an elevated supporting surface of the dolly and which cooperates with the wheel supported by the dolly for positively retaining said wheel immobile upon the dolly.

Various other objects and advantages of the invention will hereinafter become more fully apparent from the following description of the drawings, illustrating a presently preferred embodiment thereof, and wherein:

Figure 1 is a side elevational view looking toward the inner side of the fully assembled dolly and showing a wheel applied and anchored thereto;

Figure 2 is a top plan view of the dolly with the wheel removed;

Figures 3 and 4 are cross sectional views taken substantially along planes as indicated by the lines 3—3 and 4—4, respectively, of Figure 1 and on enlarged scales;

Figure 5 is a perspective view of a part of the invention;

Figure 6 is a perspective view of another part thereof;

Figure 7 is a similar view of still another removable part of the invention;

Figure 8 is a perspective view of the body portion of the dolly, and

Figure 9 is a perspective view of one of the roller bushings or bearings.

Referring more specifically to the drawings, a novel wheel truck or dolly in its entirety is designated generally 10 and includes a body portion, designated generally 11 and best illustrated in Figure 8. The body portion 11 includes an elongated, relatively wide bar 12 having substantially flat parallel top and bottom surfaces and substantially flat, parallel side walls. The bar 12 is provided with a depending flange 13 which extends from its bottom surface 14 and the outer side of which is disposed in the same plane as one side wall of said bar 12. Said flange 13 extends from end-to-end of the bar 12 and is tapered toward its bottom edge so that its inner side is similar to the inner side of the flange of a locomotive or railroad car wheel. The bar 12 is provided with a series of grooves 15 which extend transversely thereacross and which are longitudinally spaced relatively to one another, said grooves each defining a segment of a circle in cross section greater than a half circle and each of said grooves opening outwardly of the bottom surface 14 and extending over the flange 13, through the portion of the bar 12 exposed thereabove. The body member 11 also includes a bar 16 of the same length as the bar 12 but which is substantially narrower, corresponding substantially in width to the width of the head of a conventional rail. The bar 16 is suitably secured to or may be formed integral with the upper surface of the bar 12, said bar 16 preferably being secured to the bar 12 by welding, as seen as 17 in Figure 3. The bar 16 is preferably disposed closer to the edge of the bar 12 from which the flange 13 depends than to the other side edge or wall of said bar 12. The bar 12 is provided adjacent one of its ends with a notch 18 and has a lug or projection 19 rising from its upper surface between the notch 18 and the adjacent end of said bar and which forms a stop or abutment, as will hereinafter be described.

A pair of bushings or bearings 20 is provided for each groove 15, each bearing 20 having a circular bore 21 and an arcuate peripheral portion 22, the arc of which corresponds in length to the arc of the grooves 15. The bearing 20 also has a flat, exterior portion 23 extending between the ends of the arcuate portion 22 and disposed parallel to a tangent of the bore 21. One side of the bearing 20 is provided with a substantially half-circular extension 24 which is disposed remote to the flat surface 23 and which is arcuate in cross section so that its inner side forms a continuation of one half of the bore 21, as best seen in Figure 3. A rail engaging roller 25 is adapted to be loosely disposed in each groove 15, each roller 25 including an intermediate portion 26 of a diameter somewhat less than the diameter of the grooves 15 and restricted end portions 27 which are sized to be journalled in the bores 21. The over-all length of the rollers 25 is substantially the same as the length of the grooves 15 and after said rollers are disposed in the grooves 15, a bearing 20 is secured in each end of each groove 15 in any suitable manner, as by press fit engagement, and so that the flat surfaces 23 of said bearings will be disposed lowermost and substantially flush with the bottom surface 14 of the bar 12 and with the bearing extensions 24 disposed uppermost and extending outwardly of the side wall of the bar 12. The bearings 20 are positively retained in the ends of the grooves 15 by retaining strips 28 which are secured in any suitable manner to the side walls of the bar 12 as by welding, and the ends of which overlie the grooves 15 and abut against the outer sides of the bearings 20 below their extensions 24. The lower, flat surfaces of the extensions 24 engage the upper edges of the retaining strips 28 so that said strips in addition to preventing the bearings 20 from being displaced outwardly and out of engagement with the grooves 15 also prevent the bearings from turning in the grooves 15. Each roller 25 is provided with a lubricating passage 29 including a longitudinally extending portion which opens outwardly of one end portion 27 and branch portions which are disposed in and open outwardly of the periphery of the restricted end portions 27 and by which the bearings 20 are lubricated. A lubricating fitting, not shown, is adapted to be mounted in the outwardly opening end of each lubricating passage 29.

A stationary wheel chock 30 includes a body portion 31 of approximately the same width as the bar 16 and which has a substantially flat bottom surface which rests upon the upper surface of said bar 16 and over the notch 18. The inner end and upper surface of the body 31 is provided with an upwardly and inwardly facing, longitudinally and inwardly bowed or concave surface 32 which is adapted to abut flush against a portion of the felly or rim 33 of a locomotive or railway car wheel, designated generally 34, having the usual annular flange 35 which projects beyond the felly or rim 33 at the outer edge of the wheel 34. The outer end of the block 31 is provided in its lower portion with a notch 36 which opens into the bottom surface of said body 31 and which notch accommodates a portion of the abutment 19 to prevent the chock 30 from sliding to the right beyond its position of Figure 1. Above the notch 36, the outer end of the chock body 31 has a transverse bar 37 suitably secured thereto intermediate of the ends of said bar. The bar 37 is provided with horizontally disposed slots 38 on either side of the body 31 and which open outwardly of the ends of said bar. A pair of corresponding, elongated retaining plates 39 are secured, one to each side of the body 31 in any suitable manner and said plates 39 have bottom portions extending below the bottom surface 40 of the body 31. The plates 39 are provided with aligned openings 41 which are adapted to register with a downwardly opening groove 42 formed in the bottom surface 40 and which groove is disposed directly over the transverse groove 18 of the bar 16, with which the openings 41 likewise register so that the grooves 18 and 42 together with the openings 41 form a transverse passage through the chock 30 in which an anchoring strip 43 is removably disposed and which combines with the abutment 19 to prevent the chock from sliding from left to right of Figure 1 and also functions to prevent the chock 30 from sliding to the left of its position of Figure 1, for a purpose which will hereinafter become apparent.

A movable chock 44 includes a body 45 corresponding to the body 31 except that the notch 36 and groove 42 are omitted and which has a longitudinally concave surface 46 corresponding to the surface 32 adapted to engage another portion of the wheel felly 33 and plates 47, corresponding to the plates 39, except that the openings 41 are omitted and which plates 47, like the plates 39, straddle the bar 16 and fit tightly on either side thereof. The chock 44 is provided with a transverse bar 48 extending across its outer end, corresponding to the bar 37 and provided with similar slots 49.

The wheel truck 10 including the body portion 11 equipped with the rollers 25 and having the stationary chock 30 mounted thereon in the position as illustrated in Figures 1 and 2, is positioned on the head 50 of a conventional railroad rail 51 in front of or behind a defective locomotive or railroad car wheel 34 and with the dolly flange 33 disposed on the outer side of the rail 51 and with the rollers 25 engaging the tread of the rail head 50 to support the dolly 10. The dolly 10 is disposed on the rail 51 with the end thereof, remote to the chock 30 disposed adjacent to the wheel 34. A ramp, designated generally 52, constituting a part of the invention, is then disposed on the rail head 50 between the wheel 34 and the adjacent end of the dolly 10. The ramp 52 includes a block of substantially the same width as the rail head 50 which is relatively long and has a substantially flat bottom surface to rest on said rail head. The block 53 is provided with plates 54 which are secured to and depend from the sides thereof, similar to the plates 39 and 47 and which straddle and closely engage opposite sides of the rail head 50. The block 52 has an inner end which abuts against an end of the bars 12 and 16 and has an upper surface 55 adjacent said end which is disposed at the same level as the upper surface of the bar 16. The block 53 is provided with a long inclined ramp surface 56 which extends from its opposite end to the opposite end of the top surface 55. Assuming that the wheel 34 engaging the rail 51, adjacent the ramp 52 is defective, by moving the car or locomotive on which said wheel 34 is mounted in a direction so that the defective wheel 34 will be moved toward the dolly 10, the felly 33 of said wheel will be moved into engagement with the ramp surface 56 up which said felly portion will roll or slide, if the wheel is incapable of revolving, onto the top surface 55 and from this surface onto the top surface of the bar 16 along which the wheel felly will be moved until a portion thereof is in abutting engagement with the surface 32 of the stationary chock 30, as illustrated in Figure 1. The ramp 52 may then be removed from the rail 51 and the movable chock 44 is then applied to the end of the bar 16 remote to the chock 30 and positioned with its portion 46 abutting another part of the wheel felly 33, as seen in Figure 1. Two rods 57 each having threaded end portions 58, each of which carries two nuts 59 and two washers 60 interposed between the nuts 59, are then applied to the wheel chocks 30 and 34 by positioning a threaded end portion 58 of each rod 57 in engagement with the aligned slots 38 and 49 of the bars 37 and 48 and with said bar ends disposed between the nuts and washers which engage the threaded ends 58. The two outermost nuts 59 of each rod 57 are then screwed inwardly of the rod end 58 and into engagement with the outer sides of the bars 37 and 48 for drawing the movable chock 44 as much as possible toward the stationary chock 30 for effectively wedging a portion of the wheel felly 33 between said chocks, after which the inner nuts 59 are displaced outwardly of the rod ends 58 to clamp the ends of the bars 37 and 48 between the complementary nuts and washers to securely hold the chocks in applied position on the bar 16 and in engagement with the wheel rim 33, so that the car or locomotive on which the wheel 34 is mounted may then be moved over a pair of tracks 51 to a repair shop or other suitable location and with the dolly rollers 25 riding one of said rails 51 and supporting the portion of the load normally supported by the defective wheel 34 which is securely mounted on said dolly 10. When the repair location has been reached, by loosening the eight nuts 59 the rods 57 may be removed from the bars 37 and 48 so that the chock 44 may then be removed, after which the ramp 52 is replaced in its position as seen in Figure 1 so that the defective wheel 34 may roll or slide off of the dolly 10 back onto the rail head 50 over the ramp surface 56. Obviously, if desired, the rods 57 may be first secured to the bar 37 before the wheel 34 engages the dolly 10 and prior to application of the movable chock 44 and said rods 57 may be left in place while the movable chock 44 is removed and while the wheel 34 is disengaged from the dolly, as previously described, by simply removing the nuts and washers which engage against the outer side of the bar 48.

Various modifications and changes are contemplated and may obviously be resorted to, without departing from the spirit or scope of the invention, as hereinafter defined by the appended claims.

I claim as my invention:

1. A locomotive or railroad car wheel supporting dolly comprising an elongated body structure, a plurality of rollers journalled in said body structure in longitudinally spaced relationship to one another and disposed transversely of said body structure, said rollers having peripheral portions extending below the body structure and adapted to engage the tread portion of a rail head for mounting the body structure for rolling movement along said rail head, said body structure having a depending flange at one side edge thereof extending below the bottom portions of said rollers and adapted to engage against the outer side of the rail head, said body structure having an upper portion extending from end-to-end thereof of approximately the same width as a conventional rail head and substantially narrower than the portion of the body structure disposed therebeneath, said restricted upper portion forming an auxiliary rail head adapted to support a defective locomotive or railroad car wheel thereon in an elevated position relatively to a rail engaged by the dolly, a stationary chock mounted on one end of said auxiliary rail head having a concave portion adapted to be disposed in abutting engagement with a portion of the wheel felly, means cooperating with said wheel felly portion to retain said stationary chock immovably on the auxiliary rail head, a movable wheel chock slidably mounted on the opposite end of the auxiliary rail head for movement toward and away from the stationary wheel chock having a concave upper portion adapted to engage flush against another portion of the wheel felly, said chocks being disposed on either side of an intermediate wheel felly portion which engages the auxiliary rail head, and connecting means detachably connected to the wheel chocks and urging the movable wheel chock toward the stationary wheel chock for anchoring the wheel on the auxiliary rail head portion and securing it immovably upon the dolly.

2. A wheel dolly as in claim 1, and a ramp having an end abutting the end of the body structure remote to the end thereof on which the stationary chock is supported including a top surface disposed adjacent said end and at the same level as the top surface of the auxiliary rail head and a ramp surface extending downwardly from one end of said top surface and merging at its opposite end with the upper surface of the rail head on which the dolly is supported, said ramp comprising an elongated block having a flat bottom surface resting on the rail head.

3. A wheel dolly as in claim 1, and a ramp having an end abutting the end of the body structure remote to the end thereof on which the stationary chock is supported including a top surface disposed adjacent said end and at the same level as the top surface of the auxiliary rail head and a ramp surface extending downwardly from one end of said top surface and merging at its opposite end with the upper surface of the rail head on which the dolly is supported, said ramp comprising an elongated block having a flat bottom surface resting on the rail head, and flanges depending from the sides of said block and snugly embracing the sides of the rail head and detachably and frictionally mounting the ramp thereon.

4. A wheel dolly as in claim 1, each of said chocks including an elongated block of substantially the same width as said auxiliary rail head having a flat bottom surface resting on and disposed longitudinally of the auxiliary rail head, each of said wheel chock blocks having flanges depending beneath its bottom surface and secured to the opposite sides thereof for snugly embracing a portion of the auxiliary rail head therebetween.

5. A wheel dolly as in claim 1, each of said chocks including an elongated block of substantially the same width as said auxiliary rail head having a flat bottom surface resting on and disposed longitudinally of the auxiliary rail head, each of said wheel chock blocks having flanges depending beneath its bottom surface and secured to the opposite sides thereof for snugly embracing a portion of the auxiliary rail head therebetween, the block of said stationary chock having a groove in its underside extending transversely thereof, said auxiliary rail head having a transverse groove in its upper side registering with said aforementioned groove, said flanges of the stationary chock having openings registering with one another and with said grooves, and an anchoring element extending through said openings and grooves and combining therewith to form said means for immovably securing the stationary block to the auxiliary rail head.

6. A wheel dolly as in claim 1, said stationary chock having a notch opening toward the auxiliary rail head and away from the movable chock, and an abutment fixed to and rising from one end of said auxiliary rail head and engaging in said notch to prevent movement of the stationary chock away from the movable chock.

7. A wheel dolly as in claim 1, said body structure having grooves of arcuate cross section extending from side to side thereof and opening outwardly of its bottom surface in which the rollers are journalled, each of said rollers being of substantially the same length as the groove in which it is rotatably disposed and being provided with restricted end portions, and bearing elements removably secured in the ends of said grooves and journalling the restricted end portions of the rollers.

8. A wheel dolly as in claim 1, said body structure having grooves of arcuate cross section extending from side to side thereof and opening outwardly of its bottom surface in which the rollers are journalled, each of said rollers being of substantially the same length as the groove in which it is rotatably disposed and being provided with restricted end portions, bearing elements removably secured in the ends of said grooves and journalling the restricted end portions of the rollers, and retaining strips secured to side walls of said body structure and overlying the ends of said grooves and the outer ends of said bearings and combining with the intermediate portions of the rollers for retaining the rollers and bearings in said grooves.

9. A wheel dolly as in claim 1, said body structure having grooves of arcuate cross section extending from side to side thereof and opening outwardly of its bottom surface in which the rollers are journalled, each of said rollers being of substantially the same length as the groove in which it is rotatably disposed and being provided with restricted end portions, bearing elements removably secured in the ends of said grooves and journalling the restricted end portions of the rollers, and retaining strips secured to side walls of said body structure and overlying the ends of said grooves and the outer ends of said bearings and combining with the intermediate portions of the rollers for retaining the rollers and bearings in said grooves, said bearings having semicircular portions projecting outwardly from the side walls of the body structure and overlying the upper edges of said retaining strips whereby the bearings are nonrotatably retained in said grooves by said retaining strips.

ROGER G. McGOWAN.

No references cited.